(12) United States Patent
Tong

(10) Patent No.: US 7,881,268 B1
(45) Date of Patent: Feb. 1, 2011

(54) GROUP LIST UPDATE SYSTEM AND METHOD

(75) Inventor: Zhou Tong, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 1040 days.

(21) Appl. No.: 11/060,040

(22) Filed: Feb. 17, 2005

(51) Int. Cl.
*H04W 4/00* (2009.01)

(52) U.S. Cl. .................. 370/338; 455/418; 455/419; 455/434; 455/435.1

(58) Field of Classification Search .................. 370/338; 455/519, 518, 416, 435.1–435.3
See application file for complete search history.

(56) References Cited

U.S. PATENT DOCUMENTS 6,975,863 B1 * 12/2005 Miernik ....................... 455/434

6,990,353 B2 * 1/2006 Florkey et al. .............. 455/519
2006/0111135 A1 * 5/2006 Gray et al. ................... 455/519

OTHER PUBLICATIONS

Law Enforcement Needs Document for Packet-Based Dispatch Service, Issue 2, Jul. 20, 2004.

* cited by examiner

*Primary Examiner*—Lester Kincaid
*Assistant Examiner*—Sayed T Zewari

(57) ABSTRACT

In a group list update method, a group data server signals to one or more registration servers (e.g., a SIP registration server and/or a Mobile-IP registration server), to notify the registration servers of a group list update. In turn, the next time the registration server sends a registration response to an affected wireless client station, the registration server will include in the registration response a flag indicating that an update is available (or, e.g., an indication of the current version of the group data). In response to being alerted of that updated group data is available, the recipient wireless user station will then send an update request to the group data server, and the group data server responds by conveying the group list revisions to the user station.

20 Claims, 4 Drawing Sheets

US 7,881,268 B1

GROUP LIST UPDATE SYSTEM AND METHOD

BACKGROUND

The present invention relates to telecommunications and, more particularly, to management of group membership information for instant messaging, group conferencing and the like. The invention is particularly useful with respect to wireless communication devices such as cell phones and wirelessly-equipped personal digital assistants (PDAs), but the invention can extend as well to apply with respect to other sorts of communication devices.

In an exemplary wireless communication system, each mobile station may communicate via an air interface with a base transceiver station (BTS) and in turn with a base station controller (BSC). The BSC may then be coupled with a mobile switching center (MSC). Further, the BSC may be coupled with packet data serving node (PDSN) or other gateway, which may provide connectivity with an IP network, such as the public Internet or a private intranet (e.g., a wireless carrier's core IP network). The mobile station may thus communicate with entities on the IP network via a communication path comprising the air interface, the BTS, the BSC and the PDSN.

A mobile station can initiate packet-data communication by sending an initiation request message over an air interface access channel, and via the BSC, to the MSC. Applying industry standards, the initiation request message may include a "packet data" service option code that characterizes the requested communication as packet-data communication, as compared with traditional voice communication. When the MSC receives the initiation request, it may then detect the "data" service option code and responsively send the message back to the BSC for handling.

In turn, when the BSC receives the initiation request from the MSC, the BSC may establish a radio link layer connection with the mobile station, by assigning the mobile station to operate on a particular traffic channel over the air interface (e.g., a fundamental traffic channel, and perhaps one or more supplemental channels). In addition, the BSC may pass the initiation request to the PDSN. And the PDSN and mobile station may then negotiate with each other to establish a data-link layer connection, typically a point-to-point protocol (PPP) session over which packet data can be communicated between the mobile station and the PDSN.

As part of this process, the mobile station may obtain an IP address, to facilitate packet communications. For instance, the PDSN may assign an IP address to the mobile station, or the PDSN may communicate with a mobile-IP "home agent" to obtain an IP address for mobile station.

(Note that it may also be possible for a mobile station to engage more directly in packet-switched communications, rather than communicating packet data through a channelized PPP connection. For instance, the BTS itself might sit as a node on an IP network, and the mobile station might send and receive individual packets via the BTS.)

A mobile station, like other packet-data terminals, can be further equipped to communicate real-time media, such as voice and/or video. For instance, the mobile station may include one or more media input mechanisms, such as a microphone or video camera, and may further include logic to digitize, encode and packetize media received through those mechanisms. Additionally, the mobile station may include logic to encapsulate the resulting packets with industry standard Real Time Protocol (RTP) headers and to transmit the resulting RTP packets to one or more designated addresses on the IP network.

Similarly, the mobile station may include logic to receive incoming RTP packets from the IP network, to assemble the packets in sequence, and to depacketize and decode the data carried by the packets so as to retrieve an underlying media signal. Further, the mobile station may include one or more media output mechanisms, such as a speaker or video display, through which to play out the incoming media signal to a user.

In order for a mobile station to establish RTP communication with another endpoint, the two endpoints will usually engage in setup signaling, which may take a variety of forms. For instance, according to the industry standard Session Initiation Protocol (SIP), an initiating endpoint may send to a SIP proxy server a SIP "INVITE" request message that designates a terminating SIP address. The INVITE may include a Session Description Protocol (SDP) block that characterizes the proposed session as an RTP session.

The proxy server may then query a SIP registry to determine an IP address of the terminating endpoint. And the proxy server may then forward the INVITE to that address. If the terminating endpoint agrees to establish the session, the terminating endpoint may then send a SIP "200 OK" message via the proxy server to the initiating endpoint. And the initiating endpoint may responsively send a SIP "ACK" message via the proxy server to the terminating endpoint. The endpoints may then begin to communicate RTP packets with each other.

Another way for two or more endpoints to establish and conduct a real-time media session with each other is through a communication server (e.g., a multipoint conference unit (MCU)). The communication server may function to set up respective RTP sessions ("legs") with each participating endpoint and to bridge together the legs so that the participants can communicate with each other.

For instance, an initiating endpoint may send to a proxy server an INVITE that requests an RTP session with one or more designated terminating endpoints, and the proxy server may forward the INVITE to the communication server. The communication server may then respond with a 200 OK to the initiating endpoint, and the initiating endpoint may respond with an ACK, thus establishing an RTP leg (initiating leg) between the initiating endpoint and the communication server.

At the same time, the communication server itself may send an INVITE via the proxy server respectively to each designated terminating endpoint and establish RTP legs (terminating legs) with each of those other endpoints. In turn, the communication server may bridge together the initiating leg with each of the terminating legs, so as to allow all of the endpoints to communicate with each other.

By establishing real-time media sessions in this manner between mobile stations, a wireless carrier can conveniently provide its subscribers with PTT service. In particular, each "PTT-capable" mobile station can preferably include a talk button or other actuating mechanism that a user can engage in order to initiate a PTT session with a designated group of one or more other users. When the user presses the PTT button, a PTT client application on the mobile station may responsively send an INVITE request to a proxy server. And the proxy server may forward the INVITE to a PTT server. An SDP block in the INVITE request may identify or list a "communication group" for the user, i.e., a group of other users with whom the initiating user would like to communicate. The PTT server may then set up RTP legs with the initiating user and with each member of the group. And the PTT server may then bridge together the communication legs in a designated manner, so as to allow the members of the group to communicate with each other and with the initiating user.

To simplify the initiation of PTT communications, the mobile station of the initiating user may be provided with a group list that identifies other mobile stations with which communications may be initiated. Instead of entering a SIP address or other contact address of another PTT-enabled mobile station, an initiating user may select a mobile station or communication group from the partition list and then engage the talk button to talk with the selected mobile station or communication group.

Group lists may be useful to allow team members working together on a project to contact one another with minimal delay. However, when individuals in various teams are frequently added or removed, group lists can become difficult and inconvenient to keep up to date.

In a group communication system, such as a PTT system or an instant messaging (IM) system, group membership data is typically stored by a network-based group data store, so that network-based application servers can facilitate group communications. For example, when an IM server receives an instant message from a subscriber, destined to the subscriber's "group," the IM server may refer to the group data store to determine which other subscribers are members of the sending subscriber's group, and the IM server may then distribute the instant message to each of those other subscribers. As another example, when a conference server (e.g., PTT server) receives a subscriber's request to initiate a group conference with the subscriber's group, the conference server may refer to the group data store to determine which other subscribers are members of the requesting subscriber's group, and the conference server may then invite each of those other subscribers to participate in the group conference.

Typically, a client station that is arranged to support group communications will also have a locally stored copy of group membership information. The locally stored copy can assist a user of the client station in managing communications. For instance, the user can refer to the locally stored copy to see who are members of the user's group. Further, in situations where a user is a member of more than one group, the user can refer to the locally stored copy to select a desired group with which to engage in a group communication. The locally stored copy can be used for other purposes as well.

A need exists to synchronize the locally stored copy of group membership data with the network-based copy of group membership data. In particular, if changes are made to the network-based copy of the group membership data, then an update should be sent to each affected client station, so that users of those stations can have access to the most current set of relevant group membership data.

One way to ensure that wireless client stations receive applicable updates to group membership data is for the wireless client stations to periodically request any applicable updates from a network server. For instance, each wireless client station can be set to send a query to a group data server every 10 minutes (or other time period) to obtain the latest version of the applicable group data, or to obtain any incremental update to the client station's local copy of the group data. A problem with this arrangement, however, is that such query and response messaging by many wireless client stations in a given region can tend to overload the wireless communication infrastructure.

To avoid such excessive messaging, another solution is to have the group data server push updates to affected wireless client stations whenever such updates occur, i.e., on an as-needed basis. For instance, the group data server could send the updates to the affected client stations in the form of SMS messages (e.g., one or a series of SMS messages). Or the group data server could send SMS-based alert messages (e.g., WAP-push or MMS messages) to the affected client stations, to cause each client station to send an update request to the group data server, and to then receive the group data update.

SUMMARY

The present invention provides an improved mechanism for updating local group data on wireless client stations. The invention stems from a realization that wireless user stations already periodically send registration messages to one or more network-based registration servers and receive responses to those registration messages. For instance, wireless client stations periodically register with a SIP registration server (sending a SIP REGISTER message and receiving a 200 OK message in response) and, typically, with a Mobile IP registration server.

In accordance with an exemplary embodiment of the invention, when the group data server receives or detects an update of group data, the group data server will signal to one or more registration servers (e.g., a SIP registration server and/or a Mobile-IP registration server), to notify the registration server(s) of the group data update. In turn, the next time the registration server sends a registration response to an affected wireless client station, registration server will include in the registration response a flag indicating that an update is available (or, e.g., an indication of the current version of the group data). In response to being alerted of that updated group data is available, the recipient wireless client station will then send an update request to the group data server. Thus, the invention provides for updating on an as-needed basis but uses the existing registration process to facilitate triggering the update request.

DETAILED DESCRIPTION

Figure 1:
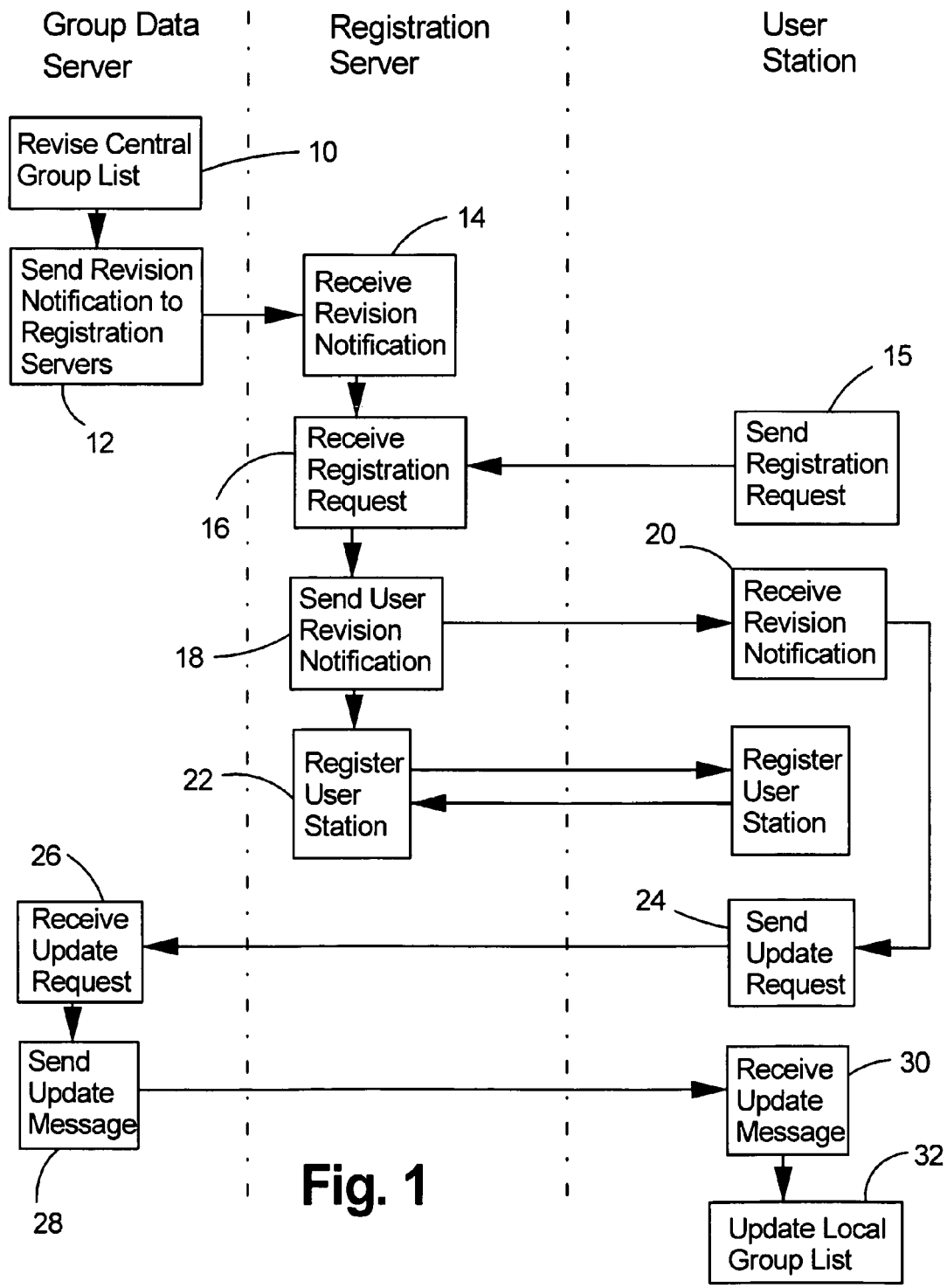
FIG. 1 is schematic flow diagram of a method for updating a group list.

I. Overview of a System and Method for Updating Group Lists

A. Introduction

In one embodiment, a system for managing group lists is implemented within a system in which user stations periodically send registration requests to one or more registration servers. The user stations may be, for example, mobile handsets equipped with PTT functionality. The registration servers may be, for example, SIP or mobile-IP servers. In this embodiment, a central group list is stored by a group data server. The central group list identifies one or more user stations. Each user station itself stores a local group list that corresponds to the central group list. A user station identified in a local or central group list is referred to herein as a member of that contact list. After revisions are made to the central contact list, the group data server sends a revision notification to one or more registration servers.

The revision notifications sent to the registration servers alert those registration servers that user stations should be informed of group list revisions upon registration. Thus, when a user station registers with a registration server, the registration server determines whether any group list notifications are associated with that user station. If so, the registration server notifies the user station that a group list has been updated.

If the user station receives a notification that one of its group lists has been updated, it then sends a request to the group data server to retrieve the updates. After the user station has received the updates from the group data server, the user station modifies its local group lists according to the updates.

In such an embodiment, communications between the user stations and the group data server typically take place only when updates are actually available for the user station. As a result, the burden on the group data server is minimized.

B. Exemplary Formats of Group Lists

As noted above, group lists (whether central or local) identify one or more user stations. A group list may be implemented in a variety of ways in different embodiments. In one example, a group list is a list of contact addresses of the identified user stations. If, in this embodiment, the user stations are PTT-capable mobile handsets, the contact addresses may be complete or partial SIP addresses of the user stations. The use of partial SIP addresses may be preferred when the different user stations have addresses within the same domain. For example, a SIP address of a group list member may be:

5972464692@sip.serviceprovider.com

In this example, the first ten digits of the address may be, for example, the telephone number of the mobile handset. If all the user stations in a group list have the same domain, e.g. "sip.serviceprovider.com", then the group list may omit the common domain name. A group list may associate each contact address with a name, a nickname, or other mnemonic of a person or group who can be contacted at that address.

In another optional implementation of a group list, the entity storing the group list (a group data server or user station, for example) makes use of a master list, which identifies all user stations eligible for inclusion in a group list. Each user station in the master list may be associated with a flag or other marker indicating that the user station is a group list member. In this case, the central group list may associate each user station with a record of all the group lists of which that user station is a member.

The group data server may store several central group lists. For example, when a telecommunications service provider offers PTT services to a construction firm, a group data server may store one group list identifying the user stations of all electricians, one list for engineering personnel, one list for plumbing personnel, etc. Where the entity storing the group list implements the group list with the use of a master list, each user station in the master list may be associated with one or more markers indicating of which group list or lists the user station is a member.

An entry in a group list may identify a collection of user stations. That collection may itself be a group list. For example, a group list for a team of workers may identify the user stations of each of the workers individually and have separate entries for a management team and for the entire collection of group list members.

A central group list may have an associated version number. For example, when the group list is created, it can be given version number 1. Each time the group list is revised, its version number is incremented. As described in further detail below, associating a version number with a group list can be helpful for a user station in ensuring that it has the latest version of the group list.

C. Server Revision Notifications and Server Update Messages

When revisions are made to a central group list stored at a group data server, server revision notifications are sent by the group data server to designated registration servers.

The server revision notification can but does not does not necessarily convey the revisions itself. In an embodiment in which the server revision notification does not convey the revisions themselves, the registration server, in response to receiving a revision notification, sends a server update request to the group data server. The server update request asks that the group data server convey the revisions to the group list. The group data server then sends an update message to each registration server that has sent an update request.

Server update messages, which convey the revisions to the contact list, may take different forms in different embodiments or even for different registration servers in the same embodiment. For example, server update messages may convey the entire revised central group list or, optionally, only the changes made to the central group list.

The group data server does not necessarily send revision notifications to all registration servers, but may instead select particular registration servers to receive a revision notification. In one embodiment, the group data server sends revision notifications only to registration servers that have subscribed to the group data server to receive notifications associated with particular user stations. In this embodiment, a registration server subscribes to the group data server to learn of updates to the group data affecting each user station that has registered with that registration server. For instance, when a SIP registration server receives an initial SIP REGISTER message from a given user station, the SIP registration server can responsively send a SIP SUBSCRIBE message to the group data server, requesting to be informed when the group data server receives any group list updates relating to that user station. In turn, when the group data server receives a group data update relating to that user station, the group data server can then send a SIP NOTIFY to the SIP registration server. The next time the SIP registration server receives a SIP REGISTER from that client station, the SIP registration server can include a flag in its response to the user station, to advise the user station that a group data update is available. The user station can then request that update from the group data server.

D. Identifying Users for Group List Updates

In response to a user station registering with a registration server, the registration server determines whether the user station is designated to receive a group list updates. The user stations that are to receive group list updates may be identified in a variety of fashions. In one embodiment, any user station is designated to receive a group list update if it is a member of a group list either before or after revision of the group list. In this way, a user station will receive an update if any group list of which it is a member is revised or if that user station has just been added to or removed from the group list. Other user stations may be also be designated to receive updates when particular group lists are revised.

The determination of which user station receives updates may be made by the registration server, or it may be made by the group data server. For example, the group data server may convey to the registration server, either in a server revision notification or in a server update message, the identity of user stations to which revisions will be sent.

E. User Revision Notifications and User Update Messages

In response to a user station's request to register with a registration server (using, for example, the SIP or Mobile-IP protocols), the registration server determines, as described above, whether the user station is designated to receive a group list update. If it is, the registration server sends a user revision notification to the user station.

The user revision notification can but does not does not necessarily convey the revisions themselves. In an embodiment in which the user revision notification does not convey the revisions themselves, the user station, in response to receiving a revision notification, sends a server update request to the group data server. The server update request asks that the group data server convey the revisions to the group list. The group data server then sends a user update message to each user station that has sent an update request.

In one embodiment, the user revision notification includes the version number of the central group list. This is useful in an embodiment in which the user station itself associates a version number with its local group list. When the revision notification includes the version number of the central group list, the user station compares the version number sent in the revision notification with the version number associated with the local group list. If the version number sent in the revision notification is higher than the version number of the local group list, then the user station does not have the latest version of the group list, and it requests an update from the group data server. Otherwise, if the revision notification has the same version number as that stored locally, the user station need not request an update.

User update messages, which convey the revisions to the group list, may take different forms in different embodiments or even for different user stations in the same embodiment. For example, user update messages may convey the entire revised central group list or, optionally, only the changes made to the central group list. As one example, a user update message sent to a user station that has been newly added to the central group list may identify all members of the central group list, while the update messages sent to the other user stations in the central contact list may include an instruction to insert the added user station to their local contact lists. If a user station is removed from a group list, the user update message may instruct the newly removed user station to delete its local group list, while the update messages sent to the other user stations in the central contact list may include an instruction to delete the removed user station from their local contact lists.

F. Techniques for Revising the Central Group List

Revisions may be made to the central group list in various ways. In one embodiment, revisions to the central group list are made directly by accessing the central group list through, for example, a Web-based list management application. In an alternative embodiment, revisions to the central group list are made automatically when a local group list is revised at a user station. In this embodiment, users are provided with the ability to revise local group lists, through a keypad or touch screen interface on a user's mobile handset, for example. In response to a revision made to the local group list, the user station sends an update message to the group data server, allowing the group data server to synchronize the central group list with the revised local group list. In one embodiment, the update message conveys only the changes to the local group list. Alternatively, the update message conveys the entire revised local group list. (Both the revisions alone and the entire revised list are referred to herein as "revisions" to the list.) The update message sent from the user station to the group data server can take the form of an HTTP WRITE request (a form of HTTP POST request), or it may take other forms.

G. Revising Other Group List Information

In some instances, a user station stores a record of group lists of which that user station is a member. In such cases, the user station need not store the contents of each group list. In initiating communications with members of a group, the user station identifies the group to a service provider without needing to identify all of the individual user stations that are members of the group. The record of group lists of which the user station may itself be updated according to the techniques used herein to update the group lists themselves.

As an example, when a user station first registers with a registration server, that registration server can request, from a group data server, information on any group list changes relevant to the user station. If there are any such changes, as when the user station has been added to or removed from a group list, the group data server can inform the registration server. Upon a subsequent request by the user station to register with the registration server, the registration server notifies the user station that there have been changes to its group data information. The user station then contacts the group data server to request the changes, and the group data server identifies any group lists to which the user station has been added, or from which it has been removed. The user station then revises its record of group lists in response to the information it received from the group data server. In this way, group list information other than simply the local group list may be kept up to date.

II. A Method of Updating Group List Information

One embodiment of a method for updating group list information is illustrated in FIG. 1. At step 10, revisions are made to a central group list at a group data server, using one of the methods described in section I.F, above. In response to the revising being made to the central group list, the group data server sends to one or more registration servers a notification that the revision has taken place (step 12). In step 14, a registration server receives the revision notification.

After the registration server has received a revision notification, a user station sends a registration request to the registration server in step 15. The registration server receives the registration request in step 16, and determines whether any revision notification should to be sent the registration user station. If so, the registration server notifies the user station of the revisions in step 18. This revision notification may be included, for example, in a registration response message. The user station registers with the registration server in step 22. Although the registration of step 22 is illustrated as taking place after the notification of step 18, the notification of step 18 may take place before, during, as a part of, or after the registration of the user station.

In response to receiving the revision notification, the user station, in step 24, sends an update request to the group data server. In one embodiment, in which the revision notification includes a group list version number, the user station may check the version number to determine whether its local group list requires updating (i.e., if the local group list version number is smaller than the version number sent with the revision notification.) In such an embodiment, the user station sends an update request only after it determines that its local group list requires updating.

The group data server receives the request in step 26, and it responds in step 28 by providing an update message to the user station. As noted above, the update message may contain the complete revised group list, it may convey only changes to the list (e.g., instructions to add or delete members), or it may convey other changes to group list information, such as the identity of group lists to which the user station has been added or from which it has been removed. The user station then in step 32 uses the update message to revise its own local group list information to correspond to the revisions made to the central group list.

III. A System for Updating Group List Information

A. System Architecture

Figure 2:
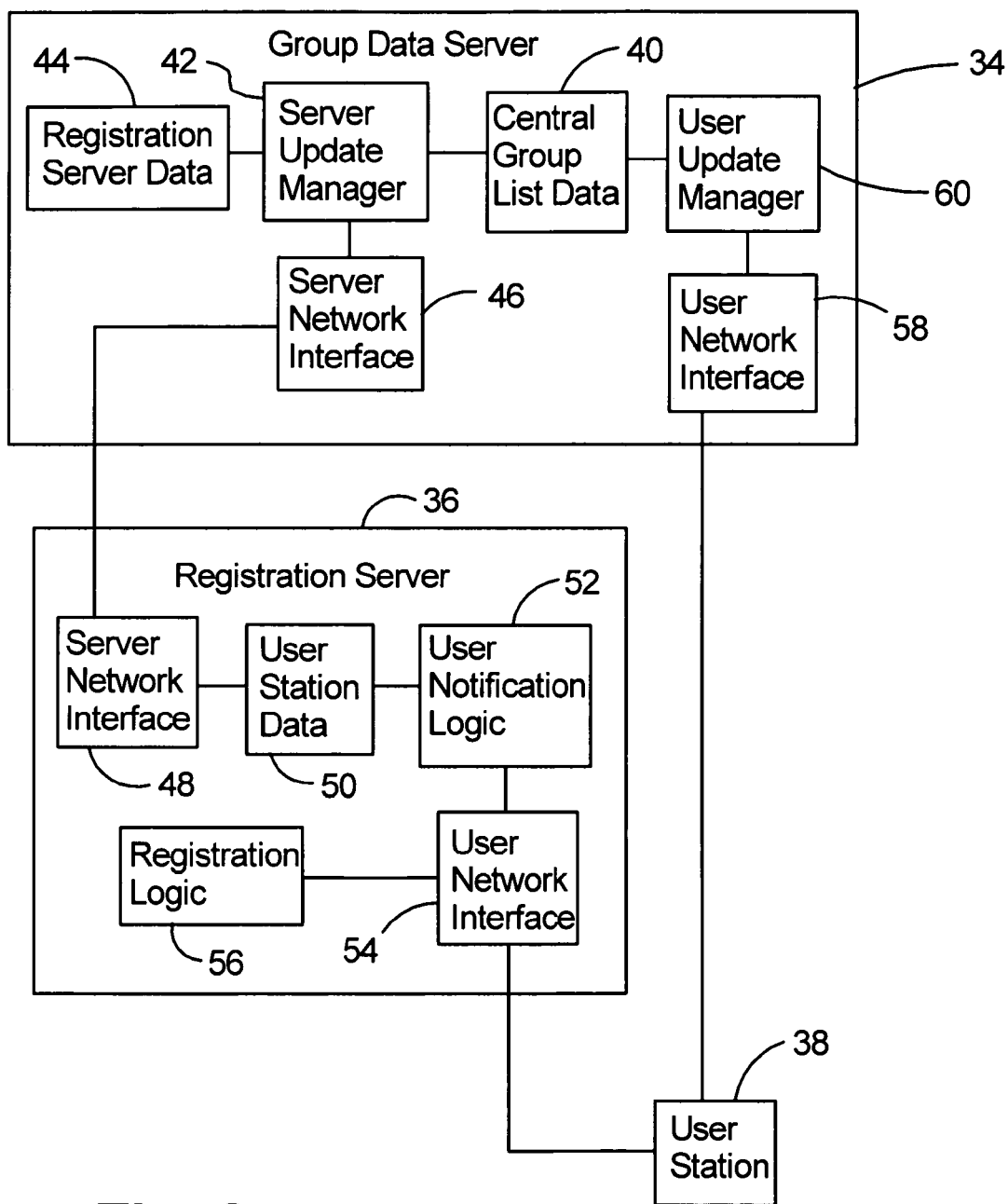
FIG. 2 is a block diagram illustrating the functional architecture of a system for updating group lists.

The architecture of a system for updating group lists is illustrated in FIG. 2. The system includes a group data server 34, a registration server 36, and a user station 38. In a typical implementation of the system, there are several registration servers and even more user stations. However, only one of each is illustrated in FIG. 2 for the sake of clarity.

The group data server 34 includes central group list data 40, which may be implemented in a database. The central group list data 40 stores group lists as described in section I.B, above. A server update manager 42 manages changes to the group list data 40. In response to revisions made to a central group list stored in the group list data 40, the server update manager 42 is responsible for informing registration servers that revisions have been made. To aid in this function, registration server data 44 identifies those registration servers that should be informed of the updates. Registration server data 44 may include a list of registration servers that have subscribed to receive revision notifications. For each listed registration server, the registration server data 44 stores an associated list of user stations, for which the registration server has subscribed to receive updates.

The group data server 34 is provided with a server network interface 46 to enable communications with one or more registration servers 36. The server network interface may include, for example, SIP and/or HTTP functionality. After changes have been made to a central contact list, the group data server 34 sends through its server network interface 46 a revision notification to the registration server 36, possibly as a SIP NOTIFY message.

The registration server 36 receives the revision notification at its own server network interface 48. If the registration server requires additional information on the revision, it can conduct further communications with the group data server 34, as described in section I.C, above. The registration server 36 stores user station data 50, which identifies user stations that have been designated to receive notification of group list revisions.

User notification logic 52 in the registration server is responsible for notifying a user station of changes to a central group list. The user notification logic 52 provides such a notification in response to a registration request received from the user station. The registration server is provided with a user network interface 54, through which the registration server communicates with the user station 38. In response to a registration request message received from the user station 38 at the user network interface 56, the user notification logic 52 determines whether the user station 38 is designated to receive a notification of any revision to a central contact list. The user notification logic 52 makes this determination based on the information stored in the user station data 50.

If the user station 38 is designated to receive a revision notification, the registration server sends the revision notification to the user station through the user network interface 54. The revision notification may be included in, for example, a registration response message generated by registration logic 56. Alternatively, the revision notification may be provided in a separate message, sent either before or after the registration response message.

In response to receiving a revision notification, the user station 38 sends an update request to the group data server 34, requesting the revisions to the group list. The group data server receives the update request at its own user network interface 58. A user update manager 60 is responsible for providing group list revisions to the user station. In response to an update request sent by the user station, the user update manager 60 generates an update message that includes the revisions to the group list. The group data server then sends the update message to the user station, and the user station updates its local group list accordingly.

B. User Stations with Push to Talk Functionality

Figure 3:
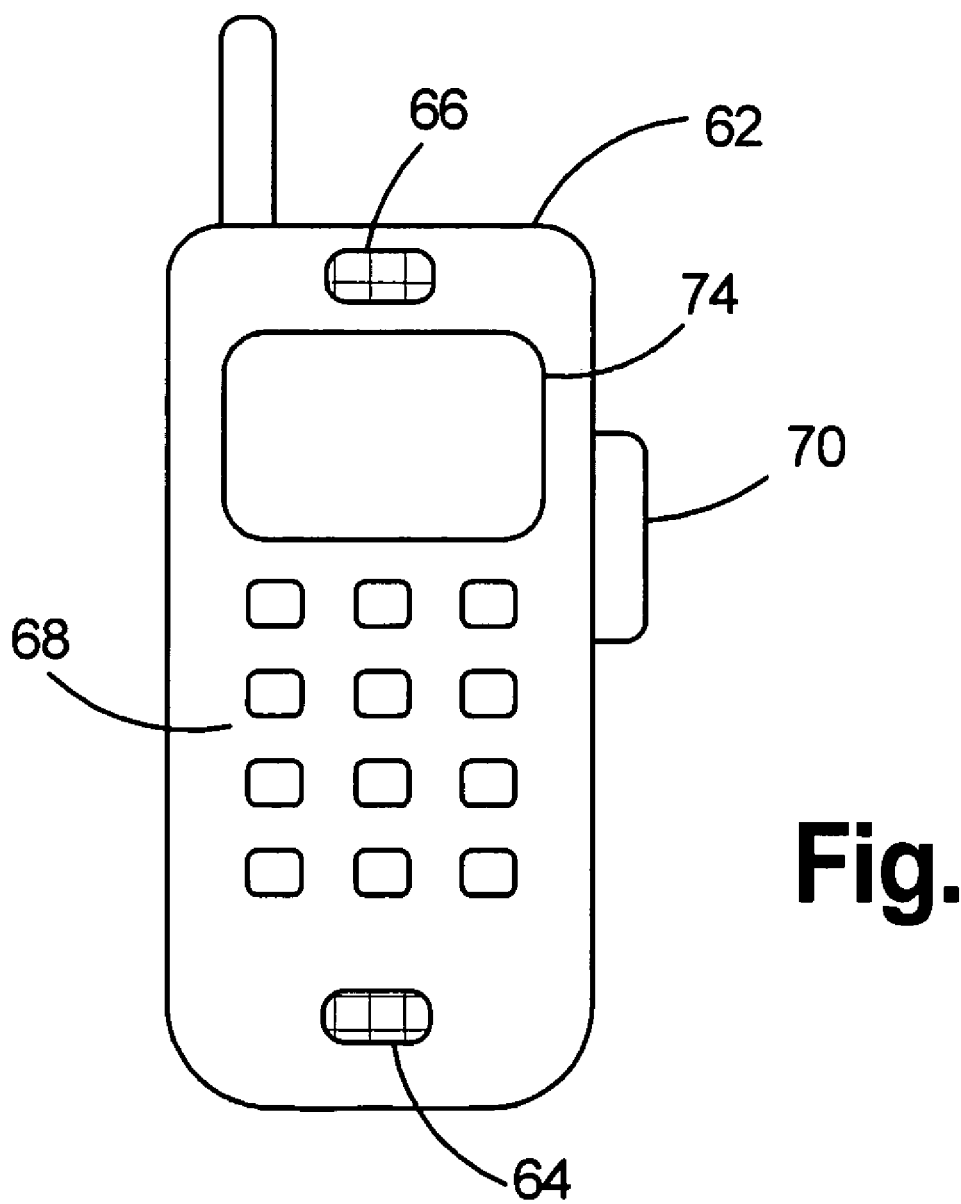
FIG. 3 is a front view of a user station used in a system for updating group lists.
Figure 4:
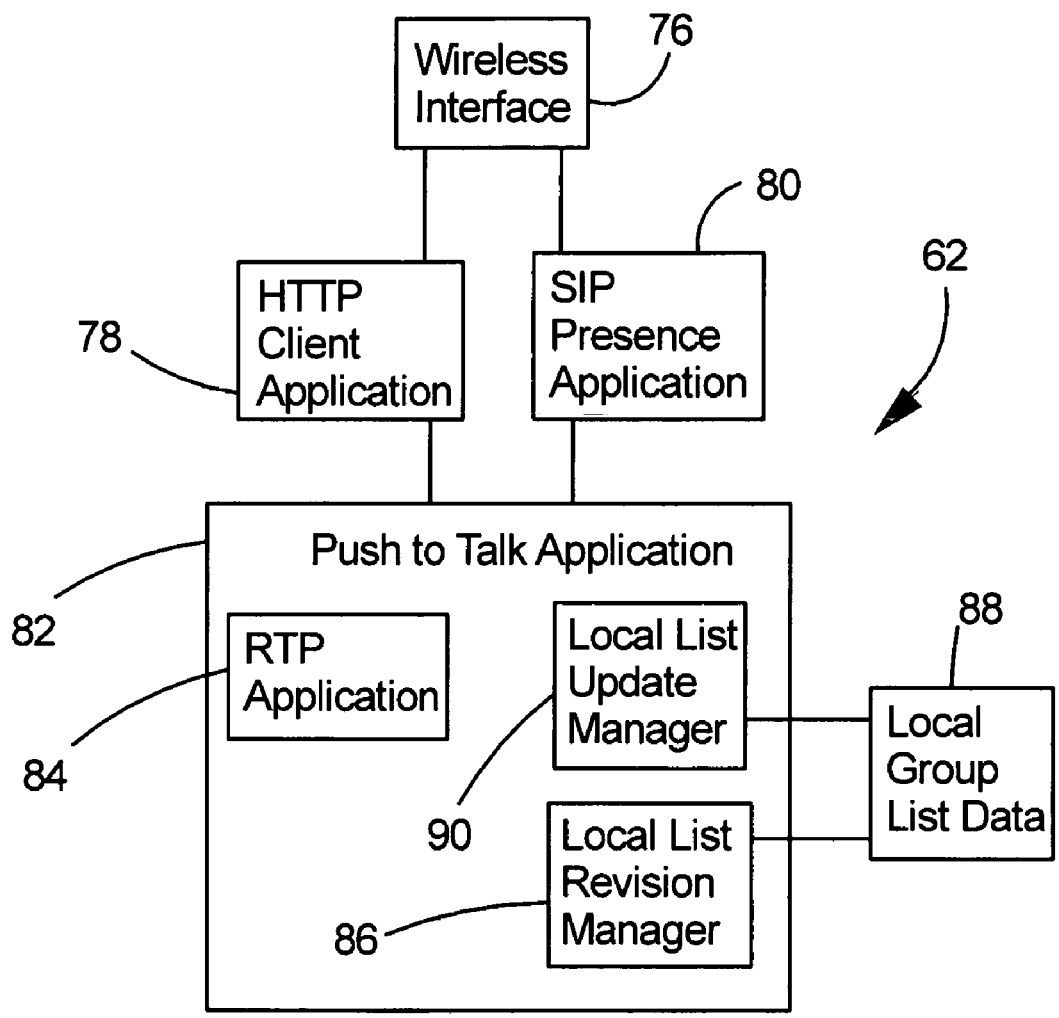
FIG. 4 is a block diagram illustrating the functional architecture of a system for updating group lists.

An exemplary user station, such as may be employed with the system of FIG. 2, is illustrated in FIGS. 3 and 4. As illustrated in FIG. 3, the user station is a PTT-enabled mobile handset 62, provided with a microphone 64 and speaker 66, a keypad 68, a PTT button 70, and a display (such as an LCD display) 74. The operation of the handset 62 by a user is discussed first, with reference to FIG. 3. The architecture that supports the operation of the handset 62 is then described with respect to FIG. 4.

1. Operation of the PTT Handset

To assist users in initiating a PTT communication, the handset 62 (FIG. 3) renders a local group list on the display 74. To render the group list, the handset 62 may display an individual's name or other mnemonic associated with a group list member, rather than displaying, for example, a SIP group address associated with each member. A user may select one or more members of the group list using a user input device, such as the keypad 68. The mnemonic of a selected group list member may be displayed in reversed (white on black) text and/or otherwise highlighted in the display 74. The handset 62 may permit the user to select more than one member of the group list.

The handset 62 may store more than one local group list. If so, the user may select the desired local group list from among the different local group lists. The group lists may be organized in different folders or directories in a tree structure.

To initiate a PTT communication with the selected group list member or members, the user of the handset 62 presses the PTT button 70. The handset 62 indicates through a visual alert (on display 74 or elsewhere) and/or an audio alert (through speaker 66 or another speaker) whether communications have been successfully initiated. If so, the user of the handset 62 speaks into the microphone 64 to communicate with the selected group list member or members.

The user of the handset 62 can modify local group lists by using the keypad 68 to add or delete members of the local group lists, or to modify mnemonics or contact addresses of members of the local group lists.

2. The Architecture of the PTT Handset

The architecture of the handset 62 is illustrated in FIG. 4. The handset includes a wireless interface 76, which provides hardware and/or software to communicate wirelessly with the service provider (over a wireless 3G network, for example). An HTTP client application 78 and a SIP presence application 80 each communicate with the wireless interface 76. The handset 62 is further provided with a communications application, such as the PTT application 82. The PTT application 82 manages the PTT communications of the handset 62. In an embodiment in which the PTT communications are carried out using the real time protocol (RTP), the PTT application includes an RTP application 84. For a description of the RTP, see H. Schulzrinne et al., "RTP: A Transport Protocol for Real-Time Applications," RFC-1889 (January 1996).

The handset includes local contact list data 88, which may store one or more local group lists. The PTT application 82 includes a local list revision manager 86, which permits users to revise local group lists by entering information through the keypad 68 and/or cursor control 72 (FIG. 3) of the handset 62. A local list update manager 90 is provided to revise the local group list data 88 in response to update messages received by the handset 62 from a group data server.

In an exemplary operation of the handset 62, a user enters revisions to a local group list through a user input device, such as the keypad 68. The local list revision manager 86 makes the revisions to the local group list data 88 and sends the revisions to the group data server, through the HTTP client application 78, as an HTTP WRITE request.

After revisions are made to a central group list and the user station sends a registration request message to a registration server, the local list update manager 90—through the wireless interface 76—receives a revision notification sent by the registration server. The revision notification may be included in a registration response message, or it may be, for example, a SIP NOTIFY message processed by the SIP presence application 80.

In response to the revision notification, the local list update manager 90—through the HTTP client application 78—sends an HTTP request to the group data server requesting an update message. The local list update manager—through the HTTP client application 78—then receives an update message in the form of an HTTP response from the group data server. The local list update manager 90 then updates the local group list data 88 in accordance with the changes conveyed in the update message.

IV. Alternative Group List Update Systems and Methods

A system for maintaining group list updates may be implemented as described in the embodiments above, or with variations on and combinations of these embodiments. For example, the components of the group data server and the registration server may be implemented hardware or by one or more software programs stored in data storage, such as a hardware memory (as RAM or ROM), a magnetic medium, such as a hard drive, and/or an optical data medium, such as a CD-ROM or DVD-ROM, or a combination of such media. The software programs may be stored in data storage as executable instructions for performing the functions of a contact list update system as described herein. Such a system further includes a processor (defined herein to encompass either a single processor or multiple processors, if more than one processor is used) for executing the instructions.

Likewise, the components of the user station or stations may be implemented by a processor, data storage such as a ROM chip, and executable instructions stored in the data storage for performing the functions of a user station as described herein.

Data stored by the group data server or the registration server may be stored in a database, and it may be stored in a hardware RAM memory, a hard drive, or other memory. Data stored by a user station, such as local group list data, may be stored in a RAM memory or in another memory type.

An exemplary described herein supports communications between PTT mobile handsets; however, a contact list update system as described herein may be implemented in support of other communications systems that make use of registration messages.

It should be noted that the word "revisions" as used herein encompasses both the singular and the plural, so that making a single change qualifies as making "revisions."

As demonstrated by these several variations, the embodiments described herein are provided as illustrations of possible embodiments of the invention, rather than limitations on the scope of the invention, which is defined by the claims that follow.

The invention claimed is:

1. In a communication system in which a user station registers with a registration server with the registration server receiving a registration request from the user station and sending to the user station a registration response message as a response to the registration request, a group list update method comprising:

upon receiving the registration request from the user station, the registration server determining that the user station is designated to receive a revision notification indicating to the user station that a group list update is available;

responsive to determining that the user station is designated to receive the revision notification, the registration server including the revision notification in the registration response message, so that when the user station receives the registration response message the user station will receive the revision notification, thereby causing the user station to then request and receive the group list update.

2. The method of claim 1, wherein the registration request is a Session Initiation Protocol (SIP) REGISTER message and the registration response message is a 200 OK message sent as a response to the SIP REGISTER message.

3. The method of claim 1, wherein the revision notification is a flag set in the registration response message.

4. The method of claim 1, wherein the revision notification is a group list version number included in the registration response message.

5. The method of claim 1, further comprising:

after sending the registration response message containing the revision notification, receiving, at a group data server, an update request from the user station; and in response to receiving the update request, sending group list revisions to the user station.

6. The method of claim 5, wherein the group data server and the registration server are different servers.

7. The method of claim 5, wherein the group list revisions identify one or more other user stations to be added to a group list.

8. The method of claim 5, wherein the group list revisions identify one or more group lists to which the user station is to be added.

9. The method of claim 1, further comprising:

the registration server receiving an earlier registration request from the user station;

responsive to the earlier registration request from the user station, the registration server sending to a group data server a subscription message requesting notification of group list revisions relevant to the user station;

after the registration server sends the subscription message to the group data server, the registration server receiving from the group data server a notification message indicating that a group list update is available for the user station; and responsive to the notification message from the group data server, the registration server storing user station data indicating that the user station is designated to receive a revision notification.

10. The method of claim 9, wherein determining whether the user station is designated to receive a revision notification includes:

referring to the stored user station data to determine whether the user station is designated to receive a revision notification.

11. The method of claim 2, wherein the revision notification is a group list version number included in the registration response message.

12. In a communication system in which a user station registers with a registration server with the registration server receiving a registration request from the user station and sending to the user station a registration response message as a response to the registration request, a group list update method comprising:

the registration server receiving a first registration request from the user station;

in response to the first registration request, the registration server subscribing to receive notification of group list revisions associated with the user station;

the registration server thereafter receiving a first notification of a group list revision associated with the user station;

the registration server thereafter receiving a second registration request from the user station; and the registration server sending, to the user station, in a response to the second registration request, a second notification of the group list revision associated with the user station.

13. The method of claim 12, further comprising:

receiving, from the user station, an update request requesting the revision to the group list; and in response to the update request, sending an update message to the user station, wherein the update message conveys the revision to the group list.

14. The method of claim 13, wherein the group list revisions identify one or more other user stations to be added to a group list.

15. The method of claim 13, wherein the group list revisions identify one or more group lists to which the user station is to be added.

16. The method of claim 13, wherein the receiving of the update request from the user station and the sending of the group list update are performed by a group data server, and wherein the receiving of the second registration request and the sending of the second notification are performed by a registration server different from the group data server.

17. The method of claim 12, wherein the second registration request is a Session Initiation Protocol (SIP) REGISTER message and the response to the second registration request is a 200 OK message sent as a response to the SIP REGISTER message.

18. The method of claim 12, wherein the second notification includes a version number of the group list.

19. A group list update system, comprising:

a registration server, wherein a user station registers with the registration server, with the registration server receiving a registration request from the user station and sending to the user station a registration response message as a response to the registration request; and a group data server storing a central group list;

wherein the group data server is operative, in response to a revision to the central group list, to notify the registration server of the revision to the central group list;

wherein the registration server is operative, in response to the registration request by the user station and in view of being notified by the group data server of the revision to the central group list, to include in the registration response message a revision notification that notifies the user station of the revision to the central group list; and wherein the group data server is operative, in response to a request that the user station sends after the user station receives the revision notification in the registration response message, to convey the revision to the user station.

20. The system of claim 19, wherein the registration server is operative, in response to the registration request by the user station, to request from the group data server revisions to the central group list that are relevant to the user station.

* * * * *